US011613436B2

(12) United States Patent
Hartmann et al.

(10) Patent No.: US 11,613,436 B2
(45) Date of Patent: Mar. 28, 2023

(54) METHOD AND DEVICE FOR LOADING CONTAINERS WITH PACKAGES

(71) Applicants: Bernd Hartmann, Grafschaft-Leimersdorf (DE); Wolfram Grafe, Elmenhorst (DE)

(72) Inventors: Bernd Hartmann, Grafschaft-Leimersdorf (DE); Wolfram Grafe, Elmenhorst (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/486,581

(22) Filed: Sep. 27, 2021

(65) Prior Publication Data

US 2022/0112040 A1  Apr. 14, 2022

(30) Foreign Application Priority Data

Oct. 8, 2020 (DE) .......................... 102020126448.8

(51) Int. Cl.
*B65G 65/10* (2006.01)
*B65G 57/10* (2006.01)
(Continued)

(52) U.S. Cl.
CPC .............. *B65G 65/16* (2013.01); *B25J 15/12* (2013.01); *B65G 57/10* (2013.01); *B65G 65/32* (2013.01);
(Continued)

(58) Field of Classification Search
CPC ........ B65G 57/10; B65G 65/10; B65G 65/16; B65G 65/32; B25J 15/12
(Continued)

(56) References Cited

U.S. PATENT DOCUMENTS 3,565,225 A    2/1971  Fay
4,332,411 A *  6/1982  Ellzey ................... E21B 19/155
                                                414/22.52
(Continued)

FOREIGN PATENT DOCUMENTS

AT        401633 B    10/1996
CN      107117470 A    9/2017
(Continued)

OTHER PUBLICATIONS

U.S. Appl. No. 17/490,926, filed Sep. 30, 2021, Grafe et al.

*Primary Examiner* — Douglas A Hess
(74) *Attorney, Agent, or Firm* — Reinhart Boemer Van Deuren et al.

(57) ABSTRACT

A method for loading a container with packages, using a device having at least one guide. At least one hand element is displaceable in the longitudinal direction of the guide, and is provided on the at least one guide. The hand element has a plurality of finger elements. The finger elements have at least two flexible flank elements extending together from one end of the finger element to the opposing end. The at least two flexible flank elements of the finger elements are flexibly connected together via a plurality of webs. The finger elements may be adjusted from at least one curved position into at least one extended position and back. The at least one hand element takes packages one after the other, and deposits the packages into the container in a stack. The hand element is displaced along the guide between the deposit of two successive packages.

45 Claims, 11 Drawing Sheets

(51) Int. Cl.
*B25J 15/12* (2006.01)
*B65G 65/16* (2006.01)
*B65G 65/32* (2006.01)

(52) U.S. Cl.
CPC ............... *B65G 2203/0233* (2013.01); *B65G 2203/041* (2013.01); *B65G 2814/0305* (2013.01)

(58) Field of Classification Search
USPC .......................................... 414/285; 198/512
See application file for complete search history.

(56) References Cited

U.S. PATENT DOCUMENTS

| | | | | |
|---|---|---|---|---|
| 5,769,592 | A * | 6/1998 | Christenson | B65F 3/046 294/902 |
| 5,800,112 | A | 9/1998 | Stafford | |
| 6,652,014 | B2 * | 11/2003 | Schmalz | B25J 15/0616 414/737 |
| 8,333,417 | B2 * | 12/2012 | Bannasch | B25B 7/02 294/99.1 |
| 8,777,551 | B1 * | 7/2014 | Widder | B65H 3/322 414/796.6 |
| 8,807,613 | B2 * | 8/2014 | Howell | B65F 3/04 294/902 |
| 9,725,257 | B2 * | 8/2017 | Schenning | B65G 67/08 |
| 9,802,720 | B2 * | 10/2017 | Baylor | B65B 5/105 |
| 9,969,573 | B2 * | 5/2018 | Girtman | B65G 67/24 |
| 10,226,865 | B2 * | 3/2019 | Nakayama | B25J 9/1669 |
| 10,906,186 | B2 * | 2/2021 | Takahashi | B25J 9/1697 |
| 11,027,921 | B2 * | 6/2021 | Cole | B25J 15/0047 |
| 11,148,889 | B2 * | 10/2021 | Hartmann | B65G 65/02 |
| 11,401,120 | B2 * | 8/2022 | Hartmann | B65B 69/00 |
| 2017/0096301 | A1 | 4/2017 | Hartmann et al. | |
| 2022/0097973 | A1 * | 3/2022 | Grafe et al. | |
| 2022/0161427 | A1 * | 5/2022 | Yerazunis et al. | |

FOREIGN PATENT DOCUMENTS

| | | |
|---|---|---|
| DE | 102015116720 A1 | 4/2017 |
| DE | 102016109313 A1 | 11/2017 |
| EP | 2241403 A1 | 10/2010 |
| EP | 3725713 A1 | 10/2020 |
| WO | WO 2006/108486 A1 | 10/2006 |
| WO | WO 2014/088415 A1 | 6/2014 |

* cited by examiner

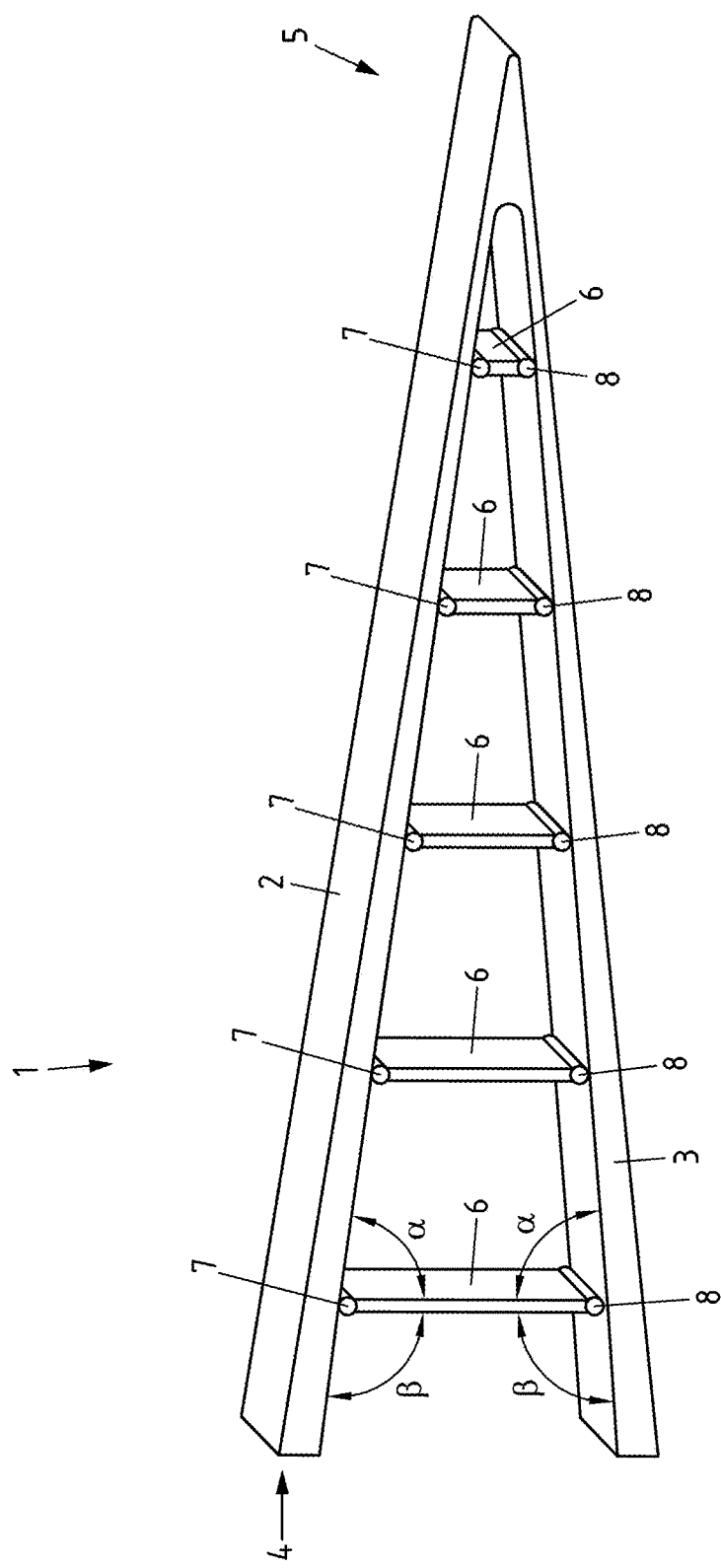

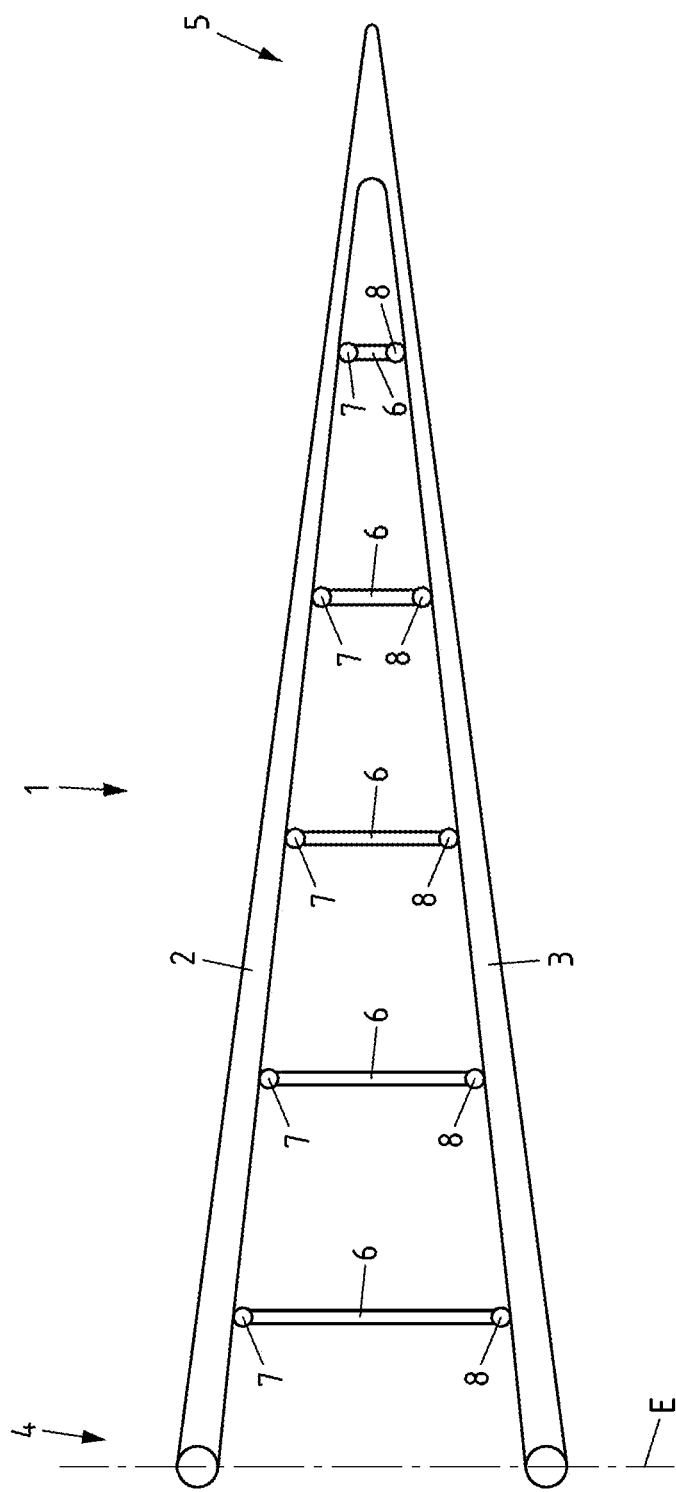

METHOD AND DEVICE FOR LOADING CONTAINERS WITH PACKAGES

FIELD OF THE INVENTION

This invention generally relates to a method for loading a container, in particular box body, swap container or roll container, with packages. The invention further relates to a device for loading a container, in particular box body, swap container or roll container, with packages according to such a method.

BACKGROUND OF THE INVENTION

Various methods for loading containers with packages are already known. These containers may be bodies of utility vehicles which are denoted, for example, as box bodies. So-called swap containers are understood to mean bodies of utility vehicles which are either borne by a chassis of a utility vehicle or are positioned on legs on the substrate. In the last-mentioned case, the chassis of the utility vehicle below the swap container may be driven out and the swap containers left in situ. In this case, utility vehicles are understood to mean, in particular, such vehicles which are provided for the transport of packages on the public road network. Additionally, however, containers which are primarily used in factory premises, in warehouses and the like, are also relevant. Such containers may be provided fixedly with rollers and thus are also often denoted as roll containers. Roll containers are loaded, for example, with packages and subsequently in turn unloaded into the utility vehicle bodies.

The packages are generally more or less stacked in the containers so that the volume of the containers may be better utilized. Nevertheless, the stacks may often be quite irregular so that the loading of the containers does not take up too much time. In addition, the packages often may not have any uniform dimensions but very different dimensions which only permits the stacking of the packages with limitations. Whilst the packages may often have quite different dimensions, for utilizing the available volume of the containers the containers are loaded as far as possible up to below the roof of the containers, provided these containers have a roof.

If a plurality of containers are to be loaded in a short period of time, namely as the packages have to be sorted and redistributed in a short period of time, an effective and efficient loading of the containers with packages is desirable. To this end, various methods which use various aids such as telescopic belt conveyors have already been proposed. In most cases, the loading of the containers with packages is carried out by personnel who take the packages from an aid such as a telescopic belt conveyor and then stack the packages in the containers, wherein the stacking typically takes place from front to back and depends on the sizes of the containers to be stacked. Generally, the packages have been additionally sorted in an upstream process so that in many cases the packages may have very different sizes and weights, wherein the sequence of the packages to be loaded is generally randomly produced. All of these methods, however, are quite complex and not yet satisfactory regarding costs.

Thus, the object of the present invention is to design and develop the method which is mentioned in the introduction and described above in more detail such that the loading of the containers with packages may take place more effectively and more efficiently. These and other advantages of the invention, as well as additional inventive features, will be apparent from the description of the invention provided herein.

BRIEF SUMMARY OF THE INVENTION

This object is achieved according to claim 1 by a method for loading a container, in particular box body, swap container or roll container, with packages, with a guide device comprising at least one guide, wherein at least one hand element which is preferably displaceable in the longitudinal direction of the guide is provided on the at least one guide device, wherein the hand element has a plurality of finger elements, wherein the finger elements in each case have at least two flexible flank elements extending together from one end of the finger element to the opposing end of the finger element, wherein in each case the at least two flexible flank elements of the finger elements are flexibly connected together in each case via a plurality of webs, so that the finger elements in each case may be adjusted from at least one curved position into at least one extended position and back, in which the at least one hand element takes packages one after the other, in which the at least one hand element deposits into the container the packages which have been taken one after the other in the form of a stack of packages and in which the at least one hand element is displaced along the at least one guide at least between the depositing of two successive packages.

Additionally, the aforementioned object is achieved according to claim 17 by a device for loading a container, in particular box body, swap container or roll container, with packages according to a method of claims 1 to 16, with a guide device comprising at least one guide, wherein on the at least one guide device at least one hand element, which is preferably displaceable in the longitudinal direction of the guide, is provided, wherein the hand element has a plurality of finger elements, wherein the finger elements in each case have at least two flexible flank elements extending together from one end of the finger element to the opposing end of the finger element, wherein in each case the at least two flexible flank elements of the finger elements are in each case flexibly connected together via a plurality of webs, so that the finger elements may be adjusted in each case from at least one curved position into at least one extended position and back.

The loading of the container with the packages takes place according to the invention with at least one hand element which comprises a series of finger elements and thus may make the manual loading of the packages by a person superfluous. Moreover, the invention makes use of the so-called fin ray effect in order to be able to load packages having very different dimensions into the container in a targeted manner and without causing damage, as required.

The finger elements of the hand element in each case have at least two flexible flank elements extending together from one end of the finger element to the opposing end of the finger element. In this case, it is advantageous in particular if the flank elements form the upper face and the lower face of each finger element so that the packages are always grasped by a flank element. However, this is not absolutely necessary. The flexible flank elements of each finger element, however, are connected flexibly together in each case via a plurality of webs so that the finger elements obtain the required flexibility in order to be able to be adjusted from at least one curved position into at least one extended position and back. In this case, it is particularly expedient if the finger elements are able to be curved and extended again in a stepless manner. Then the finger elements may adopt different curved positions and namely in each case specifically as is suitable for grasping and loading a specific package.

Since the packages in the container are to be stacked more or less evenly, the hand element is displaceably held on a guide of a guide device, wherein the guide device for loading the packages into the container is retracted at least partially into the container as required. Then at least one package or a plurality of packages may be stacked at the same time in the container by the at least one hand element. So that the width of the loading space of the container may be effectively utilized, after depositing at least one package in the container, the hand element is displaced along, or by means of, the at least one guide in order to be able to deposit at least one further package at a different point, in particular adjacently. Thus, even wide containers may be expediently loaded with packages. In this case it may lead to a simplification in terms of construction or regarding the handling, when the at least one hand element is configured to be displaceable in the longitudinal direction of the guide. However, depending on the embodiment of the guide and the guide device, this is not absolutely necessary.

The packages provided for loading the container may be transported from a conveying device onto the at least one hand element, so that the packages transported thereon only have to be taken by the at least one hand element. The packages to be loaded into the container are in this case taken one after the other, i.e. not at the same time. This does not mean, however, that two or more packages are not taken together by the hand element. Subsequently, however, further packages are taken and namely once again individually or in groups as required.

In order to increase the effectiveness of the loading of the container with packages, the conveying device may extend right into the container and thus transport the packages as far as the at least one hand element located in the container. If the container is increasingly loaded with packages, it may be expedient if the conveying device and/or the guide device reaches less far into the container since the container is then already partially loaded. The corresponding pulling back of the conveying device and/or the guide device in this case may take place in a stepwise manner. If the container is fully loaded with packages, it is expedient if the guide device and the conveying device are removed entirely from the loading space of the container so that the loading space may be used as fully as possible for receiving packages.

In the present case, a stack is understood to mean a plurality of packages arranged at least irregularly on top of one another and adjacent to one another. However, it is not a case of a heap in which the packages are thrown randomly on top of one another and form the shape of a cone. In some sections, however, the stack of packages may even have heap-like sections, as required.

The so-called fin ray effect may be observed in the tail fins of bony fish. If a finger is pressed at the side against these tail fins, the fins do not bend away but flex against the finger. This is made possible by a specific construction of the fins. This is correspondingly recreated in the finger elements of the at least one hand element.

The required flexibility of the finger elements may be provided, for example, by resilient flank elements or by a link chain made of rigid chain links connected together in a pivotable or articulated manner. In this case, a corresponding flexibility is only required in one spatial direction. In the spatial directions a flexibility perpendicular thereto is not absolutely necessary. Nevertheless, a flexibility in two spatial directions perpendicular to one another might be conceivable and also preferred, as required. The corresponding flexibility of the flank elements ultimately permits a curvature of the finger element starting from an extended position into a curved position, for example similar to the curvature of a finger.

So that the curvature of the finger element in one direction may be triggered, for example, by pressing against the finger element, in particular against a flank element in the opposing direction, the at least two flank elements between the two ends of the finger element are in each case flexibly connected together via a plurality of webs. In this case, the webs may be configured rigidly and connected in a pivotable or articulated manner to the flank elements. However, as an alternative to pivotable or articulated connections to the at least two flank elements, flexible, in particular resilient, webs may also be used as required. In this manner it is achieved that the webs may pivot relative to the at least two flank elements in order to permit in this manner a curvature of the finger element from an extended position into a curved position and back.

An extended position of the finger element may be understood to mean a maximum extended and/or elongated orientation of the finger element. However, it may also be a position from which the finger element may be adjusted by a further curvature into a further curved position relative to the extended position. Accordingly, the curved position does not have to be a maximum curved position. Thus, the terms extended position and curved position may be understood to mean merely relatively, i.e. as relative positions to one another, as required. Moreover, it has been considered that the finger elements may be adjusted from an extended position in the opposing direction into different curved positions.

Due to the corresponding construction, the finger element ultimately permits an adaptation of the shape to the shape of the packages to be transported, when the finger elements press against the package and/or vice versa. Thus, on the one hand, a greater bearing surface of finger element and package may be provided, which improves the handling of the package. On the other hand, the surface pressure between the finger element and package may be reduced, which promotes a handling of the package which is free of damage.

The construction of the finger element, however, also permits a precurvature to be set without a contact being present between the finger element and the at least one package, as required. For example, to this end the flank elements may be adjusted relative to one another in the longitudinal direction of the finger element. At the same time, the finger element is then curved away from the flank element, which relative to the at least one further flank element is adjusted further in the longitudinal direction to the opposing end of the finger element.

In order to be able to adjust the finger element, for example not only in one plane, the finger element may have, for example, three or more flank elements which relative to one another are connected together via webs. In this case the webs may be configured, for example, to be cross-shaped, star-shaped, rectangular, square, oval or round, in order to be able to be fixed in a simple manner to all of the flank elements. The corresponding connections in this case are preferably either pivotably or rotatably configured and/or the webs are flexibly configured.

Since a plurality of finger elements are combined to form the at least one hand element, the loading is possible even more efficiently and effectively than with individual fingers.

The packages may be grasped and loaded in a manner which is much improved and gentler in order to produce in this manner a space-saving stack of packages, by which the loading space of the container may be utilized as comprehensively as possible. In this case, the hand element may at least partially encompass the packages to be loaded, by the finger elements partially surrounding the adjacent packages as a result of the fin ray effect. Now by a simple movement of the hand element the at least one package may be displaced in a suitable manner and at a suitable point onto the stack of packages. In this case, at least one finger element of the at least one hand element may be curved before the finger element comes into contact with the packages to be grasped as required. The corresponding curvature is caused by a corresponding adjustment of the flank elements of the finger element in the longitudinal direction thereof, which inevitably leads to an increasing or reducing curvature of the finger element, depending on the direction in which the flank elements of the finger element are adjusted relative to one another. The finger elements thus may be curved further as a result of the contact with the packages to be loaded or the packages to be loaded may be grasped by the precurved fingers without a further curvature and deposited on the stack of packages. A curvature of at least one finger element before the finger element comes into contact with the packages to be loaded, however, is not absolutely necessary for performing the method described in the present case.

Packages are understood to mean, as required, a particular type of package. Packages may thus be goods packed with packaging. Packages may thus have at least one wrapper made of paper, cardboard, woven fabric or plastics and, for example, may be packets, boxes and containers as well as non-dimensionally stable containers, such as bags or sacks.

For the sake of improved clarity and to avoid unnecessary repetition, the method and the device for performing the method are described together hereinafter, without in each case differentiating specifically between the method and the device. However, it is revealed to the person skilled in the art by the context which feature is particularly preferred in each case regarding the method and the device.

In a first particularly preferred embodiment of the device, the at least one guide is a guide in the form of a rail and the guide device is configured as a rail device comprising the at least one rail. Then the at least one hand element may be expediently and reliably displaced in a structurally simple manner and namely for the sake of simplicity in the longitudinal direction of the at least one rail. Alternatively, however, the at least one hand element, for example, could also be displaced by means of a guide comprising at least one roller, wherein then the guide device may comprise at least one running surface on which the at least one roller may roll when the at least one hand element is displaced. In principle, therefore, all types of guides and guide devices which permit the displacement of the at least one hand element in a defined manner are conceivable. The guides in this case may be designed in a linear and curvilinear manner. A desired guide, for example, may also be achieved by a coupling joint gear or slotted guides.

In a first particularly preferred embodiment of the method, it is advantageous if the at least one hand element and/or at least one finger element is driven via a drive unit for adjusting the at least two flank elements in a longitudinal direction of the finger element relative to one another. Thus at least the flank elements of at least one finger element are adjusted such that the corresponding finger elements may be adjusted in a targeted manner from a somewhat curved position into an extended position and/or back. As a result, the at least one finger element of the at least one hand element may be adjusted in a targeted manner. The adjustment preferably takes place in a manner which permits an expedient grasping of packages and loading of containers with packages to be anticipated.

Alternatively or additionally, however, the package taken by the at least one hand element may also press against the hand element opposing a grasping direction of the hand element, such that at least one flank element of at least one finger element is partially pressed in. The partial pressing in of the flank element causes an adjustment of the corresponding finger element from a somewhat extended position into a somewhat curved position. In this manner the finger elements permit the packages to be taken in a reliable and at the same time gentle manner. The packages may thus expediently be taken from a conveying device and, for example by opening and/or rotating the hand element, deposited in the container. The opening of the hand element in this case is preferably associated with a spreading of the finger elements of the hand element. The hand element may thus be moved effectively in the manner of a human hand when loading the container with packages.

In order to avoid the situation where the packages are damaged in spite of the finger elements, it may be advantageous if the at least one hand element and/or at least one finger element is provided with at least one pressure sensor. Thus the pressure exerted when taking or grasping packages, by the curvature of the finger elements on the packages, may be detected and, for example, the generation of excessive forces prevented when a predetermined pressure is reached or exceeded. In this context, in particular, it is advantageous if the at least one pressure sensor is assigned to at least one flank element in order to detect the pressure exerted on the flank element. Alternatively or additionally, the weight and/or the size of the package taken from the at least one hand element may be assessed by means of the at least one pressure sensor. As required, the package then may be deposited according to the size and/or the weight at a suitable point in the container in order not to damage other packages in the container. Thus, it may be advantageous if larger and/or heavier packages are placed toward the bottom and/or in the center of the loading space of the container, whilst for example smaller and/or more lightweight packages are placed toward the top and/or to the side of the loading space of the container.

So that the loading of the container with packages is accelerated and thus may be more effective, the packages may be taken by the at least one hand element from a conveying device. The conveying device thus transports the packages onto the at least one hand element which then only has to take and deposit the packages in the container. This may be achieved in a particularly simple and expedient manner if a belt conveying device is used as a conveying device. In the case of a telescopic belt conveyor this may be retracted in a stepwise manner and depending on the loading of the container with packages which are increasingly filling up the loading space.

Alternatively or additionally, it is advantageous for a space-saving and rapid loading of the container if the packages are deposited by the at least one hand element at least substantially in layers on top of one another in the container. This is expedient, in particular, when the packages are deposited one after the other in layers on top of one another. In this manner, stacks of packages which are packed quite tightly may be generated in a simple manner.

In order to ensure an effective and at the same time space-saving loading of the container, it may be advantageous if the loading space of the container to be loaded with packages, the layer of the stack of packages already deposited by the at least one hand element, the contour of the stack of packages already deposited by the at least one hand element and/or the contour of the front face of the stack of packages already deposited by the at least one hand element are at least partially detected by a sensor. The loading in this case may be adapted very expediently to the respective loading space of the respective container and/or to the continuing loading of the loading space with the packages. For example, it may be at least partially controlled where the at least one hand element expediently deposits the subsequent packages and/or how the at least one hand element, the at least one guide device and/or the conveying device is adjusted in order to ensure a loading of the container without interruption and/or disruption. In this case, for the sake of simplicity and accuracy it is particularly preferred if the at least one sensor is at least one optical sensor, in particular a camera.

Alternatively or additionally, an effective and at the same time space-saving loading of the container may be achieved when the at least one hand element is displaced depending on the loading space, on the height of the stack of packages, on the layer of the stack of packages, on the contour of the stack of packages and/or on the contour of the front face of the stack of packages. This is advantageous for the sake of simplicity and reliability, in particular when the at least one hand element is displaced along the at least one guide. In principle, however, the guide device and/or the at least one guide may also be retracted further into the container and/or moved back in the opposing direction, depending on the loading space, on the height of the stack of packages, on the layer of the stack of packages, on the contour of the stack of packages and/or on the contour of the front face of the stack of packages. The loading with the hand element preferably takes place in a manner adapted to the increasing loading of the loading space of the container.

The stacking of packages in layers and the loading of the container may be simplified and accelerated as a whole when the at least one hand element and/or the at least one guide of the guide device is adjusted forward and/or back. In this context the term forward and/or back refers to the direction of loading which generally speaking takes place from a front end to a rear end. If the container is loaded with packages via a rear opening of the container and the at least one hand element and/or the at least one guide is adjusted forward, this corresponds to an adjustment to the front and/or in the direction of travel relative to the container. If the container is loaded from the side, the adjustment of the at least one hand element and/or the at least one guide forward and back constitutes an adjustment transversely to the direction of travel of the container. A loading of the container counter to the direction of travel, i.e. from back to front, might be rather unusual, but would have the result that the forward adjustment of the at least one hand element and/or the at least one guide, relative to the loading direction, might correspond to an adjustment to the rear relative to the direction of travel of the container. A targeted and thus effective adjustment of the at least one hand element and/or the at least one guide forward and/or back may take place when the at least one hand element and/or the at least one guide is adjusted forward and/or back depending on the loading space, on the height of the stack of packages, on the layer of the stack of packages, on the contour of the stack of packages and/or on the contour of the front face of the stack of packages.

Alternatively or additionally, the stacking of packages in layers and the loading of the container as a whole may also be simplified and accelerated by the at least one hand element and/or the at least one guide of the guide device being adjusted to the left and/or to the right. In this context, the term left and/or right denotes an adjustment to the side of the loading direction. If the container is loaded via a rear opening of the container with packages from the front face of the container to the rear face of the container and the at least one hand element and/or the at least one guide is adjusted to the left or right, this corresponds to an adjustment to the side both relative to the loading direction and relative to the direction of travel of the container. If the container is loaded from the side, the adjustment of the at least one hand element and/or the at least one guide to the left or right represents an adjustment at least substantially parallel to the direction of travel of the container. A loading of the container counter to the direction of travel, i.e. from back to front, might be rather unusual but would have the result that the adjustment of the at least one hand element and/or the at least one guide to the left or right would correspond to an adjustment transversely to the loading direction and to the direction of travel of the container. A targeted and thus effective adjustment of the at least one hand element and/or the at least one guide to the left and/or to the right may take place when the at least one hand element and/or the at least one guide is adjusted to the left and/or to the right depending on the loading space, on the height of the stack of packages, on the layer of the stack of packages, on the contour of the stack of packages and/or on the contour of the front face of the stack of packages.

In principle, the loading may be carried out expediently and rapidly when the at least one hand element and/or the at least one guide of the guide device is adjusted upwardly and/or downwardly during the loading of the container and/or between the depositing of successive packages. Thus, the packages may be laid at a height on the stack which corresponds at least substantially to the respectively current height of the corresponding stack, whereby stacks of packages may be easily formed in the container. In this context, it is particularly advantageous if the at least one hand element and/or the at least one guide is adjusted upwardly and/or downwardly depending on the loading space, on the height of the stack of packages, on the layer of the stack of packages, on the contour of the stack of packages and/or on the contour of the front face of the stack of packages.

In order to simplify a gradual loading of the container, for example from front to back, through a rear opening of the container, the at least one guide device, the at least one guide and/or the at least one hand element for depositing further packages, in particular for depositing at least one further layer of packages, may be moved into the container, further into the container, further in the direction of a position outside the container and/or moved out of the container. For the further simplification of the loading of the container it may be useful when the corresponding movement, in particular moving in and/or moving out, takes place in a stepwise manner. Alternatively or additionally, however, for the same reason the at least partial movement into the container, the movement in the direction of a position outside the container and/or the movement out of the container may take place depending on the loading space, on the height of the stack of packages, on the layer of the stack of packages, on the contour of the stack of packages and/or on the contour of the front face of the stack of packages. Ultimately a high degree of efficiency and thus effectiveness is achieved.

If at least one hand element is connected via a multi-axle arm to the guide device, to the at least one guide, to a further guide, the loading of the container may be simplified and/or accelerated, in particular, for specific packages or at specific points in the loading space. In this case it is particularly advantageous if the at least one hand element which is held by the multi-axle arm is pivotable about at least two different pivot axes of the multi-axle arm. This applies particularly when at least two pivot axes are arranged at least substantially at right angles to one another. In this context, the at least one hand element or all of the hand elements may be connected via a multi-axle arm to the guide device, to the at least one guide, to a further guide. Particularly expediently, due to the different tasks when loading containers with packages, when at least one hand element is connected via a multi-axle arm to the guide device, to the at least one guide, to a further guide, and at least one further hand element is not connected. Thus the at least one further hand element manages without an assigned multi-axle arm, as required.

It is particularly advantageous if the at least one hand element held by the at least one multi-axle arm deposits an uppermost layer of packages of the stack of packages in the container. This is based, in particular, on the loading space of the container being defined upwardly and the deposit of the upper layers thus being set different requirements from those for the deposit of the lower layers. For this reason, it is particularly expedient if the uppermost layer of packages of the stack of packages is arranged below the upper end of the loading space and/or the roof of the container, preferably adjacent to the upper end of the loading space and/or the roof of the container, by the at least one hand element held by the multi-axle arm. The deposit may take place as required from the front rather than from above. To this end, it may be advantageous if the package is held at least substantially from the front by the hand element. In this case, however, it is not necessarily excluded that the package is held by the hand element at least from above and/or from below and/or from behind.

Due to the different requirements which have been addressed for the deposit of the packages and, in particular, regarding the space available for handling the packages, it may be advantageous if at least a lower layer of packages of the stack of packages is deposited into the container by at least one lower hand element which, in particular, is not held by a multi-axle arm on the assigned guide. In contrast, at least one upper layer of packages of the stack of packages is deposited into the container by at least one upper hand element which is held by the multi-axle arm on the associated guide.

Since the range of the at least one multi-axle arm for adjusting the at least one hand element relative to the length and/or width of the loading space to be loaded may be limited, it is advantageous if the at least one upper layer of packages of the stack of packages is formed in a stepwise manner by at least one upper hand element. The at least one upper layer is thus provided in the longitudinal and/or transverse extension which is possible by the range of the multi-axle arm. Then further lower layers may be formed or supplemented so that then a further section of the at least one upper layer of packages may subsequently be formed again, adapted to the range of the at least one multi-axle arm. Otherwise, the multi-axle arm potentially could not reach far enough into the loading space in order to provide the at least one upper layer with packages in one step. Thus at least one lower layer of packages of the stack of packages may be formed by the upper hand element at least between two steps of forming the at least one upper layer, as required. In this case it is expedient for the aforementioned reasons if this at least one lower layer is produced by the at least one lower hand element.

In order to achieve an expedient, at least partial, stepwise loading of the container in a manner which utilizes as comprehensively as possible the loading space which is present, the stack of packages may be at least substantially formed from a plurality of columns of packages of the stack of packages provided adjacent to one another or at least partially overlapping one another. Thus, in a front region of the loading space a stack of packages is firstly formed up to adjacent to the roof of the container, whilst at a later time at least one further rear stack of packages is formed up to adjacent to the roof of the container. The upper or at least the uppermost layer of packages in the container is then formed in a stepwise manner, when the lower layers of the stack are created one after the other in each case. In other words, at least two columns of packages of the stack of packages may be formed one after the other in the container. This does not mean, however, that the two columns would have to be separated from one another or that a planar vertical boundary layer would have to be formed therebetween. The two columns may instead engage with one another or even transition into one another for better use of the loading space. In other words, one column does not have to be finished first before the next column is started, even when this may be preferred for the sake of simplicity. As required, it is also possible to start a column before the previous column is finished. Then, however, it is expedient in principle if the previous column is completed before the uppermost layer or the upper layers of the subsequent columns of packages are formed.

In principle, a high degree of flexibility when loading the container may be advantageously used when the at least one hand element may be displaced at least substantially in the horizontal direction and namely for the sake of simplicity and reliability, in particular, along the at least one guide. This applies, in particular, when the lower hand element and the upper hand element are held on different guides, which are preferably oriented at least substantially parallel to one another and in each case may be displaced by means of and/or along the respectively associated guide. For the sake of simplicity and reliability it is also preferred here if the corresponding hand elements may be displaced along the respectively associated guide.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 shows a finger element of a device according to the invention for performing the method according to the invention in a side view;

FIGS. 2A-2C show the functional principle of the finger element of FIG. 1 when adjusting flank elements relative to one another;

Figure 2B:
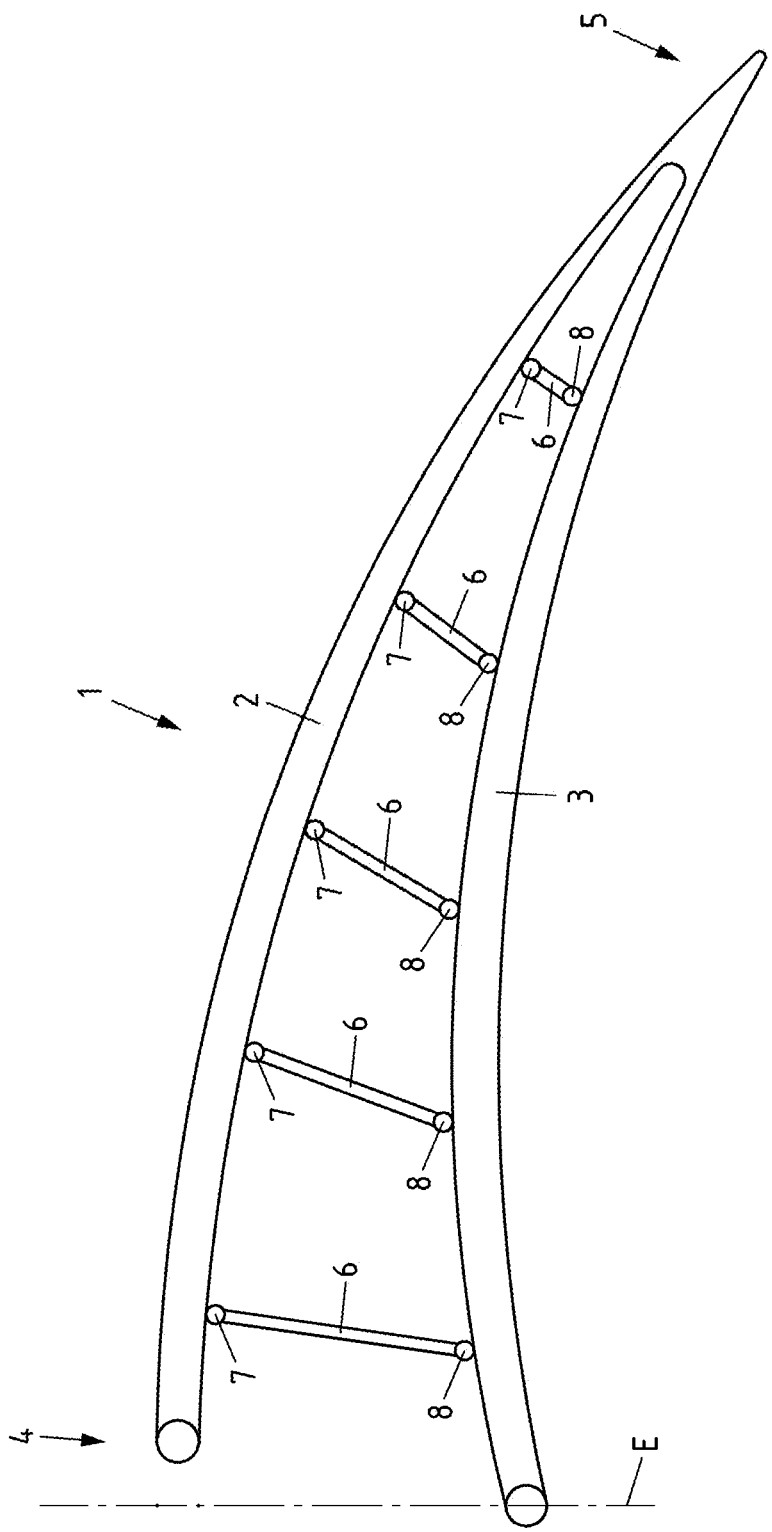

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In FIG. 1 a finger element 1 which permits an auto-adaptive deformation is shown. The finger element 1 has two flank elements 2, 3 which in the finger element 1, which is shown and in this regard preferred, run together from one end 4 of the finger element 1 to the opposing end 5 of the finger element 1. Additionally, the flank elements 2, 3 approach one another continuously in a longitudinal direction of the finger element 1. Whilst the flank elements 2, 3 are spaced apart from one another at one end 4 of the finger element 1, the flank elements 2, 3 at the other end 5 of the finger element 1 are directly connected together. Thus, a finger element 1 which tapers and runs conically in one direction is obtained.

Webs 6 are provided between the flank elements 2, 3 so as to be distributed over the length of the finger element 1, the flank elements 2, 3 being connected together thereby. In the finger element 1, which is shown and in this regard preferred, the webs 6 are connected via joints at both opposing ends 7, 8 in an articulated manner to the flank elements 2, 3. Alternatively, the webs 6 could be flexibly configured. The webs 6 in the finger element 1, which is shown and in this regard preferred, are distributed at equal spacings over the length of the finger element 1. However, this is not absolutely necessary. It is also not absolutely necessary that the webs 6, as in the finger element 1 shown, run parallel to one another. It is preferred, however, that the webs 6 enclose with each of the flank elements 2, 3 an acute angle α on one side and an obtuse angle β on the opposing side.

Figure 2C:
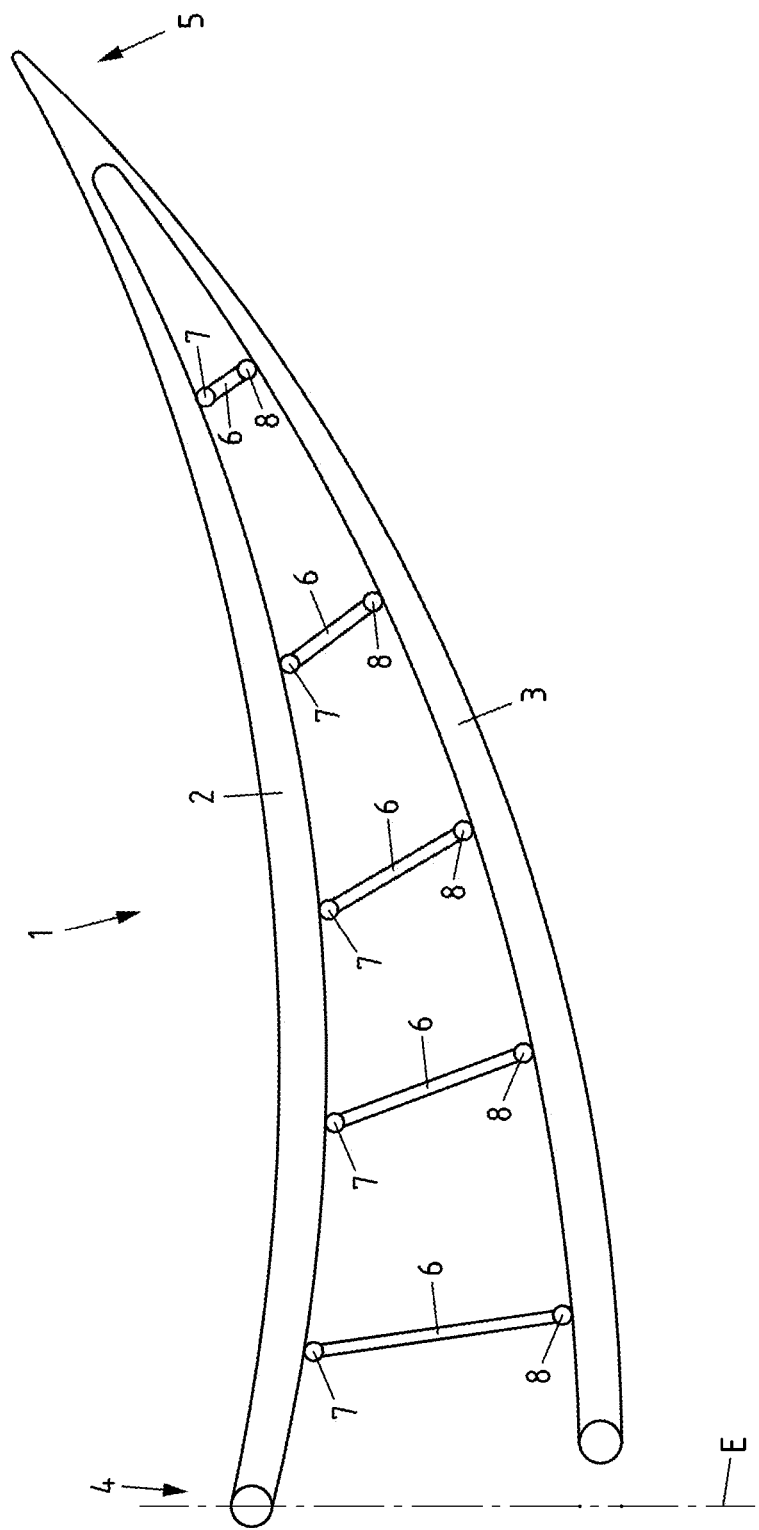

The flank elements 2, 3, which are shown and in this regard preferred, are flexibly configured so that the flank elements 2, 3 may be bent about an axis perpendicular to the longitudinal extension of the finger element 1, which is shown in particular in FIGS. 2A-C. To this end it is expedient if the flank elements 2, 3 are formed from a flexible plastic or, for example, rubber. The webs 6 may also be formed from plastics or, for example, from a metal since the webs 6 do not have to have any flexibility. In FIG. 2A, the finger element 1 of FIG. 1 is shown in an initial position in which the finger element 1 is in an extended orientation, wherein the free ends of the flank elements 2, 3 are arranged in one plane E. In the finger element 1, which is shown and in this regard preferred, the flank elements 2, 3 in this position are configured at least substantially symmetrically to one another.

If according to FIG. 2B relative to the initial position the free end of the upper flank element 2 is now displaced to the front out of the plane E shown in the longitudinal direction of the finger element 1, the finger element 1 curves downwardly as a result of the connection of the flank elements 2, 3 via the plurality of webs 6. In this manner the end 5 of the finger element 1, which is shown to the right, is adjusted downwardly. Similarly, the finger unit 1 according to FIG. 2C is curved upwardly, wherein the corresponding end 5 of the finger element 1 is adjusted upwardly when the free end of the lower flank element 3 in the longitudinal direction of the finger element 1 is displaced from the plane E to the front in the direction of the curving tip of the finger element 1. It may also be seen in FIGS. 2A-C that the webs 6 between the flank elements 2, 3 are inclined in different directions when the finger element 1 is curved.

In order to implement the displacement of the flank elements 2, 3 similar to FIGS. 2A-C, a drive unit, not shown, may be provided. In this case suitable drive units are known from the prior art. Suitable drive units, for example, may have at least one linear drive. Thus at least one flank element 2, 3 may be adjusted forward and back in a simple manner in the longitudinal direction of the finger element 1.

It is not shown that also more than two, for example at least three or four, flank elements may be provided. For the sake of simplicity, these flank elements may be arranged, in particular, equally distributed about a longitudinal axis of the finger element. The plurality of flank elements may thus run together into a common point of the finger element, in particular with free ends. Additionally or alternatively, preferably in each case the webs may connect together all of the flank elements. The flank elements 2, 3, which are shown and in this regard preferred, are configured to be strip-shaped. However, a plate-shaped or bar-shaped embodiment of the flank elements might also be possible.

Figure 3:
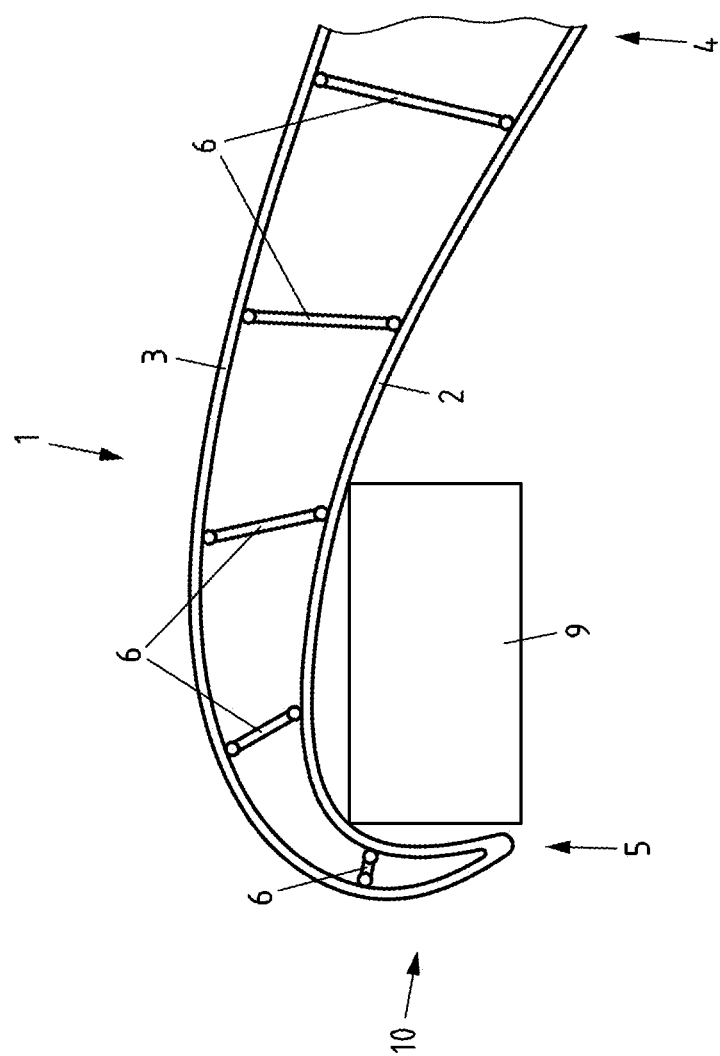
FIG. 3 shows the functional principle of the finger element of FIG. 1 with auto-adaptive adjustment of a flank.

The described finger element 1, however, may be adjusted quite differently from that shown in FIGS. 2A-C, and according to FIG. 3, which shows an auto-adaptive adjustment of a flank element 2, 3 of the finger element 1, whilst a flank element 2 presses onto a package 9 and is bent at the same time. The corresponding flank element 2 is displaced locally in the direction of the compressive force F inwardly relative to the finger element 1, which as a result of the coupling of the flank elements 2, 3 via the webs 6 leads to the flank element 2 at another point and in the direction of the two ends 10 of the flank elements 1 connected together at the end 5 of the finger unit 5, shown on the left, being curved in the direction of the package 9. As a result, the package 9 is partially encompassed by the finger element 1. A similar auto-adaptive adjustment of the finger element 1 takes place when the package presses from above against the upper flank element 2 of the finger element 1, wherein the free end of the finger element however is adjusted upwardly counter to the view of FIG. 3. The finger element is thus curved in a quite different manner from that shown in FIG. 3.

Figure 4:
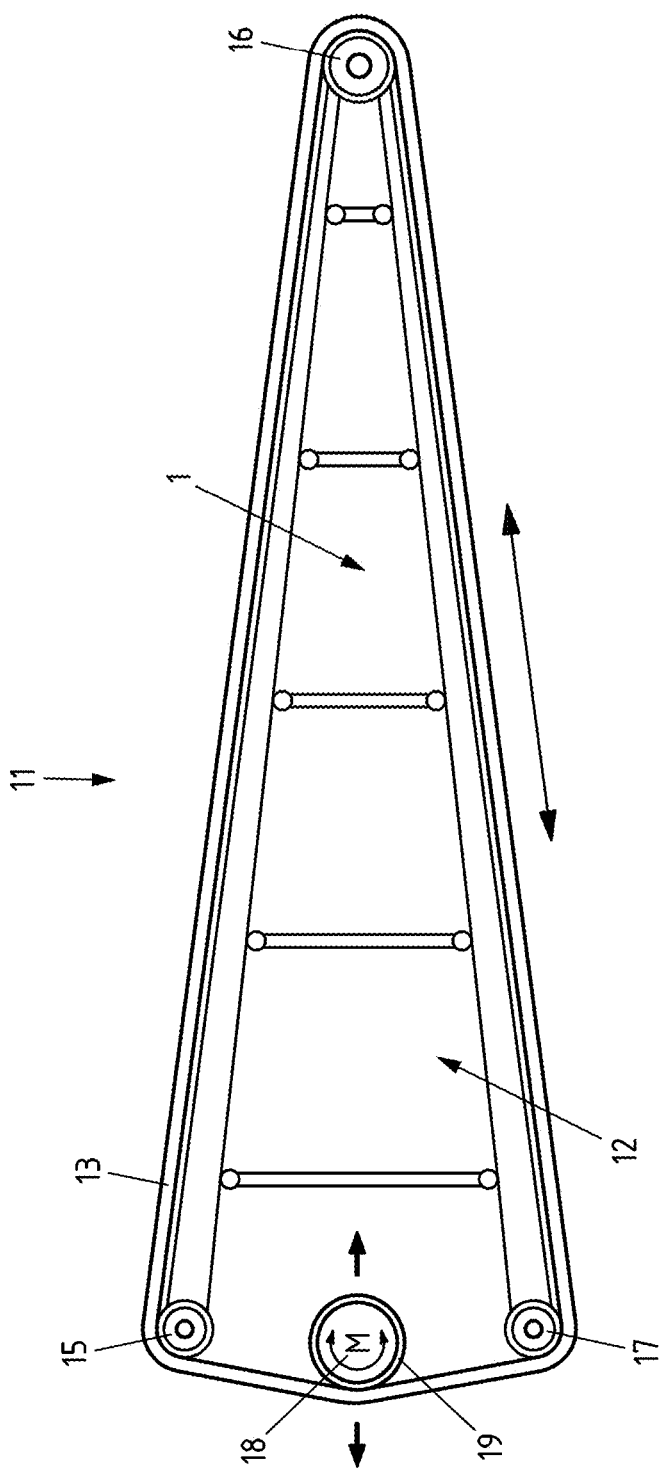
FIG. 4 shows an alternative finger element of a device according to the invention for performing the method according to the invention in a side view.

In FIG. 4 a belt conveying device 11 is shown in which the supporting structure 12 of the belt conveying device 11 consists of a finger element 1 according to FIG. 1. The belt conveyor 13 of the belt conveying device 11 runs around the supporting structure 12 and thus around the finger element 1. To this end the belt conveying device 11, which is shown and in this regard preferred, has a plurality of deflecting devices in the form of deflection rollers 15, 16, 17. A deflection roller 15 is provided at the ends 10 of the flank elements 2, 3 connected together, wherein the deflection roller 15 is ultimately borne and supported by the corresponding end 5 of the finger element 1. Moreover, in each case a deflecting device in the form of a deflection roller 16, 17 is provided at the free ends of the flank elements 2, 3.

Moreover, a drive 18 is provided, said drive in the belt conveying device 13, which is shown and in this regard preferred, being able to drive the belt conveyor 13 in different directions. The drive 18 is implemented via a drive roller 19 which as required may be adjusted to tension the conveyor belt 13, for example in the longitudinal direction of the finger element 1. Additionally, for a slip-free drive of the conveyor belt 13, a toothing may be provided on the conveyor belt 13, said toothing meshing with a toothing of the drive roller 19. In contrast to the belt conveying device 11, which is shown and in this regard preferred, the supporting structure 12 about which the conveyor belt 13 circulates may have further supporting structure parts in addition to the finger element 1.

In the belt conveying device 11, which is shown and in this regard preferred, the conveyor belt 13 is guided along the flank elements 2, 3 and namely so close that the conveyor belt 13 may be pressed by a package 9 against a flank element 2, 3 as required. The finger element 1 in this case may be adjusted in an auto-adaptive or proactive manner relative to the corresponding package 9, as has been already described. In the case of the finger element 1 of the belt conveying device 11 shown in FIG. 4, therefore, the flank elements 2, 3 are also displaced in the longitudinal direction of the finger element 1 relative to one another in order to curve the finger element 1. With the adjustment of an end 5 of the finger element 1 associated therewith in a direction perpendicular to the longitudinal extension of the finger element 1 the conveyor belt 13 and the path thereof are also adjusted around the finger element 1. If the conveyor belt 13, also in the case of a curved finger element 1, is to be guided at a small spacing from the flank elements 2, 3 along said flank elements, further devices, not shown, for positioning the conveyor belt 13 between the deflection rollers 15, 16, 17 adjoining the flank elements 2, 3 or at least one flank element 2, 3 have to be provided as required.

In FIGS. 5A-D the method for loading a container 20 with packages 21 is illustrated in individual steps. The container 20 in this case is a swap container which has been positioned on its legs 22 on a loading ramp 23. The container 20, after having been loaded with packages 21, may be driven under by a utility vehicle, namely in the form of a trailer, and coupled to the utility vehicle. The legs 22 may then be pivoted up and the container 20 driven with the utility vehicle on the public road network. The container 20 is open on its rear face 24, two leaf doors 25 having been pivoted into an open position. Then a guide device 26 of a device 27 for loading the container 20 is partially moved into the container 20, for which the guide device 26 comprises a telescopable guide system 52 by which the guide device 26 may be displaced forward and back in the loading direction B.

Figure 5A:
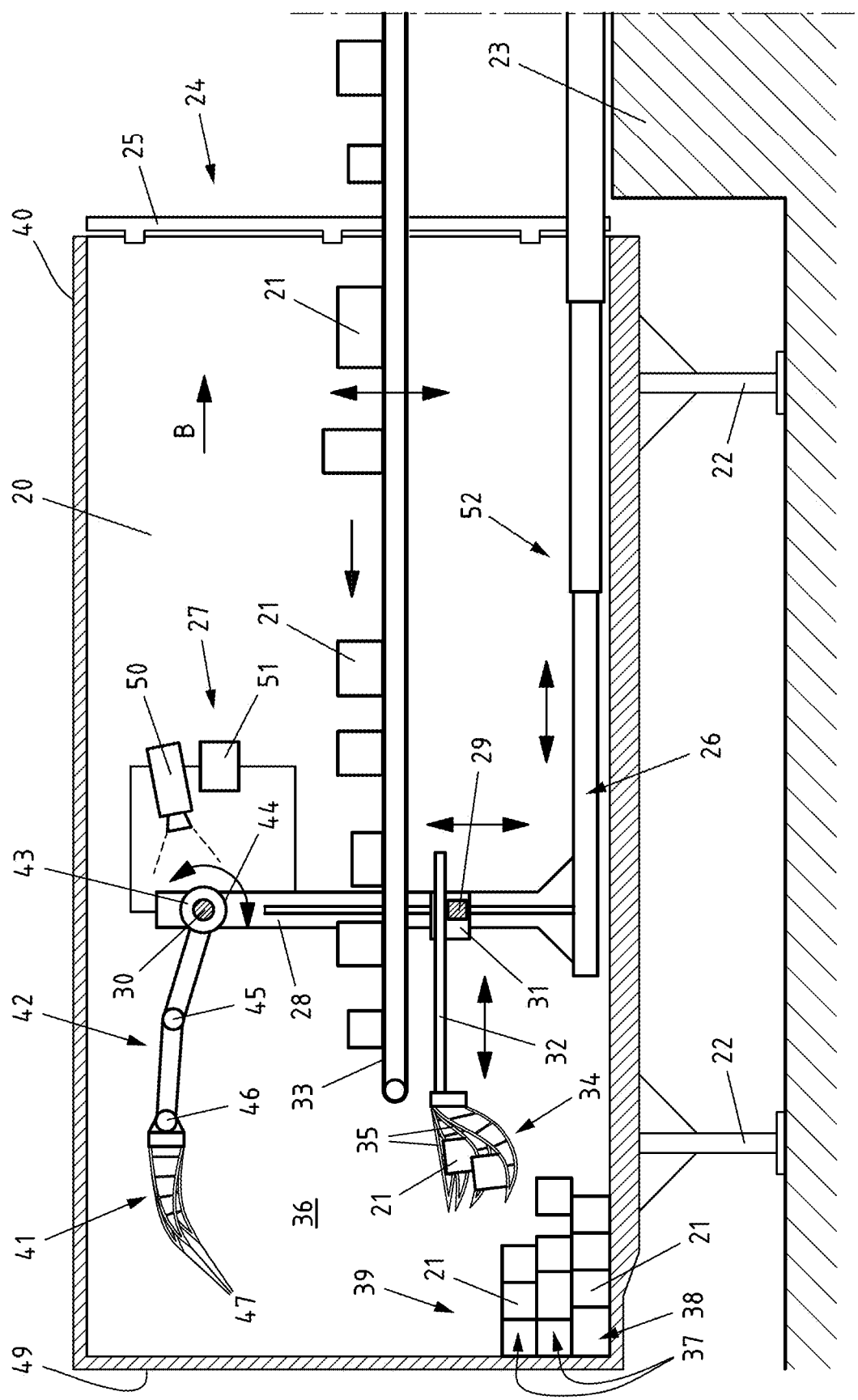
FIGS. 5A-5D show individual method steps when performing the method according to the invention with a device according to the invention in a schematic side view.
Figure 5B:
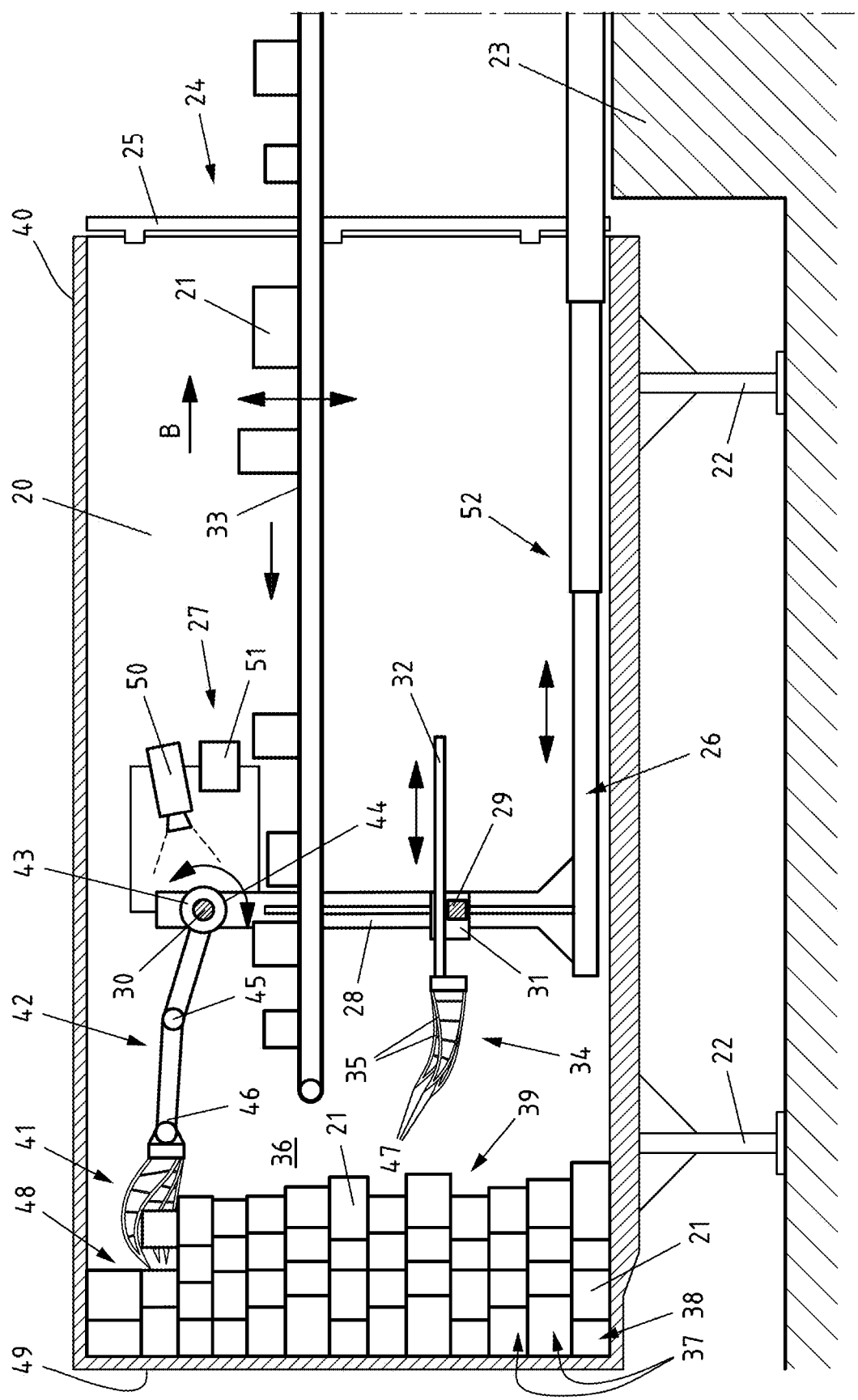
Figure 5C:
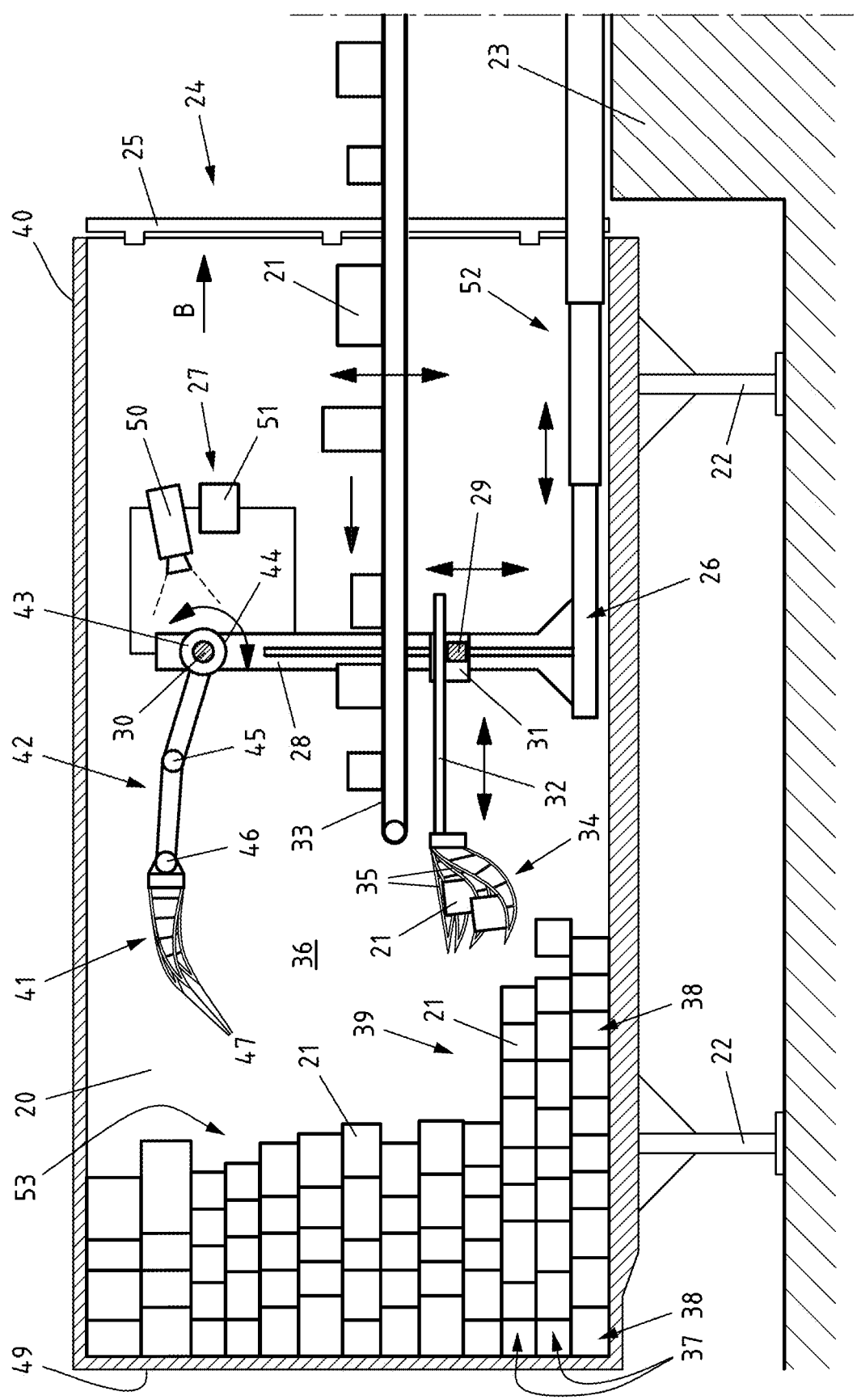
Figure 5D:
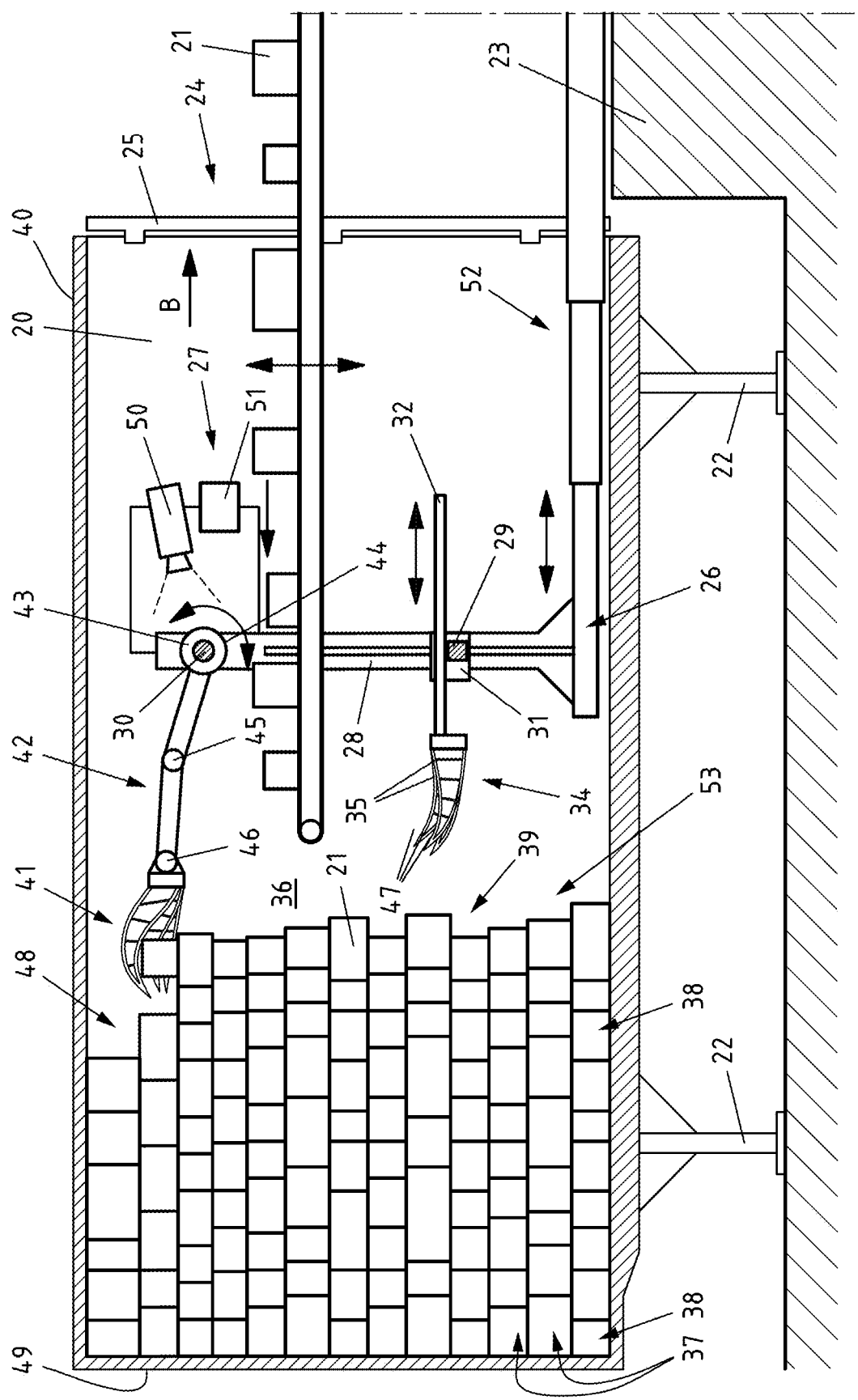
Figure 6:
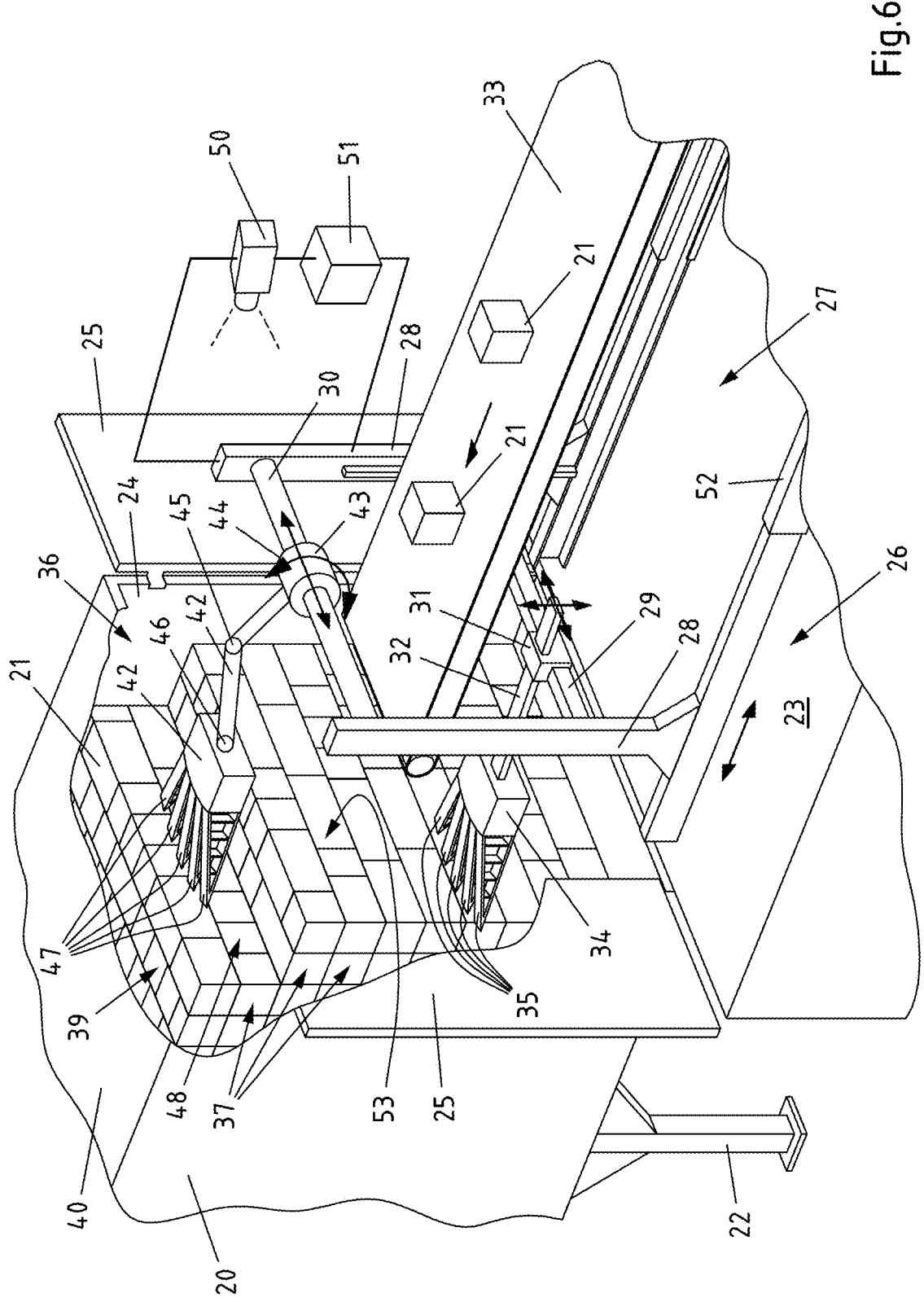
FIG. 6 shows a method step of the method according to the invention with the device according to the invention in a perspective view.

The container 20 and the guide device 26 are additionally shown in FIG. 6 in a perspective view with the container 20 already almost loaded. In this perspective view, in particular, the construction of the device 27 and of the guide device 26 is more clearly visible. Hereinafter, therefore, reference is initially made to FIGS. 5A-D and FIG. 6 together.

The guide device 26 has two upright elements 28, two guides 29, 30 being arranged therebetween. A further guide 32 is fixed via a slide element 31 on a lower guide 29. The slide element 31 permits an adjustment of the further guide 32 to the left and right, by the slide element 31 being able to be displaced along the associated guide 29 to the left and right. Relative to the slide element 31, in turn the further guide 32 may be adjusted to the front and rear. Additionally, the lower guide 29 extending between the upright elements 28 may be displaced upwardly and downwardly, to this end the corresponding guide 29 being correspondingly displaceably mounted on the upright elements 28.

In the exemplary embodiment, which is shown and in this regard preferred, the guide device 26 is configured in the form of a rail device, wherein the lower guide 29 and the further guide 32 of the guide device 26 are configured as the lower rail and further rail. Thus, the guide system 52 in the embodiment, which is shown and in this regard preferred, may also be understood as a rail system.

The corresponding guide 29 is assigned a conveying device 33 in the form of a belt conveying device which may also be adjusted upwardly and downwardly and which supplies separated packages 21. The front end of the conveying device 33 is assigned a hand element 34 which is provided with a plurality of finger elements 35 and thus may take the packages 21 from the conveying device 33. The packages 21 in the device 27, which is shown and in this regard preferred, are allowed to drop from the conveying device 33 into the hand element 34 which holds the packages 21 by corresponding adjustment of the finger elements 35, utilizing the already described fin ray effect of the finger elements 35 similar to a partially open human hand, the hand inner surface thereof being turned upwardly.

The hand element 34 is provided on the front end of the further guide 32 and by adjustment of the lower guide 29 and the further guide 32 may now deposit the packages 21 via a front section of the loading space 36 of the container 20 into individual layers 37 as shown in FIG. 5A. This takes place, for example, by a lowering of the finger elements 35 of the hand element 34, by a stretching of the finger elements 35 of the hand element 24 and/or by a spreading of the finger elements 35 of the hand element 34. The extent of the individual layers 37 in this case is predetermined substantially by the length of the lower guide 29 and the further guide 32. In this manner initially in the front section of the loading space 36 a column 38 extending over the width of the loading space 36 is formed from a plurality of layers 37 of packages 21 arranged one on top of the other, wherein the hand element 34 deposits the packages 21 more or less one after the other in the corresponding layers 37 and thus ultimately forms a stack 39 of packages 21. This stack 39 of packages 21 is composed of individual columns 38 of packages 21 which transition into one another.

If a column 38 extends upwardly into the region of the roof 40 of the container 20, there no longer remains sufficient space between the upper edge of the column 38 and the roof 40 of the container 20 in order to deposit further packages 21 on the column 38 in the described manner, as shown in FIG. 5B. To this end, a further upper hand element 41, which is fixed via a multi-axle arm 42 to a slide element 43 on the upper guide 30, is used. The upper guide 30 extends between the upright elements 28, as does the lower guide 29, wherein the slide element 43 may be displaced to the left and right along the upper guide 30. Additionally, the upper slide element 43 may be pivoted about the associated upper guide 30, wherein the pivot axis is oriented at least substantially parallel to the longitudinal axis of the upper guide 30. In addition to this pivot joint 44, the multi-axle arm 42 has two further pivot joints 45, 46, the central pivot joint 45 thereof having a pivot axis which is oriented at least substantially at right angles to the pivot axes of the two outer pivot joints 44, 46. As a result of the multi-axle arm 42, the upper hand element 41, to which a plurality of finger elements 47 is also assigned, may take individual packages 21 from the conveying device 33 and place the packages in the gap 48 between the roof 40 and the column 38 of packages 21. The packages 21 then reach as far as the roof 40 or at least close to the roof 40, as required, in order to be able to utilize as efficiently as possible the loading space 36 of the container 20.

Since the multi-axle arm 42 only has a limited range and, in principle, this also applies to the lower hand element 34, in many cases it is not preferred if the individual layers 37, which are created when loading the container 20 without interruption, extend over the entire length and the entire width of the loading space 36 of the container 20. Instead it is expedient to form the stack 39 of packages 21 in the loading space 36 of the container 20 via individual columns 38 which are created one after the other and thus may transition into one another such that then it is no longer possible to differentiate between the individual columns 38. The term column 38 is thus to be understood less in the conventional sense. The term column 38 is preferably intended to illustrate that the stack 39 of packages 21 initially grows upwardly in specific sections of the loading space 36 of the container 20 and, in particular, as far as the roof 40 or close to the roof 40 and in other sections of the loading space 36 in a later operating step grows upwardly and namely in turn preferably as far as the roof 40 or close to the roof 40.

This process is illustrated in FIGS. 5C and 5D. After a column 38 of packages 21 has been created adjacent to the front wall 49 of the container 20, the guide device 26 is pulled back slightly in order to create space for a further column 38 of packages 21 which is intended to blend in with the already created column 38 of packages 21. Then the second column 38 of packages 21 is created in a lower section by the lower hand element 34, as has been described already in combination with FIG. 5A for the front column 38 of packages 21. When the second column 38 of the stack 39 of packages 21 has reached a specific height, the remaining gap 48 between the packages 21 and the roof 40 of the container 20 is filled with the upper hand element 41, as has already been described in connection with FIG. 5B. Then the steps according to FIGS. 5C and 5D are carried out repeatedly one after the other until the container 20 is loaded with packages 21 as far as the opening of the rear face 24.

In the exemplary embodiment, which is shown and in this regard preferred, the device 27 for loading the container 20 has an optical sensor 50 in the form of a camera and a control device 51. The loading space 36 of the container 20 to be loaded with packages 21, the layer of the stack 39 of already deposited packages 21, the contour of the stack 21 and/or the contour of the front face 53 of the stack 39 of already deposited packages 21 are determined via the sensor 50. Using this information the lower hand element 34 and/or the upper hand element 41 may then be displaced from left to right, i.e. over the width of the loading space 36 along the associated guides 29, 30 provided between the upright elements 28. Alternatively or additionally, however, the lower hand element 34 and/or the upper hand element 41 may also be adjusted forward and back using the corresponding information detected by the sensor 50, i.e. in the loading direction B and/or in the longitudinal direction of the container 20. In the upper hand element 41, this takes place via the multi-axle arm 42 whilst in the lower hand element 34 this takes place via the associated further guide 32. Additionally, in the exemplary embodiment which is shown and in this regard preferred, using the aforementioned information the upper hand element 41, the lower hand element 34 and the conveying device 33 may be lifted and lowered. For the height adjustment of the lower hand element 34, the lower guide 29 extending between the upright elements 28 is moved up and down along the upright elements 28. For the sake of simplicity, in this case the height adjustment of the upper hand element 41 takes place via the associated multi-axle arm 42.

LIST OF REFERENCE NUMERALS

1 Finger element
2, 3 Flank element
4, 5 Finger element end
6 Web
7, 8 Web end
9 Package
10 End
11 Belt conveying device
12 Supporting structure
13 Conveyor belt
15 Deflection roller
16 Deflection roller
17 Deflection roller
18 Drive
19 Drive roller
20 Container
21 Package
22 Leg
23 Loading ramp
24 Rear face
25 Leaf door
26 Guide device
27 Device
28 Upright element
29 Guide
30 Guide
31 Slide element
32 Guide
33 Conveying device
34 Hand element
35 Finger element
36 Loading space
37 Layer
38 Column
39 Stack
40 Roof
41 Hand element
42 Multi-axle arm
43 Slide element
44-46 Pivot joint
47 Finger element
48 Gap
49 Front wall
50 Sensor
51 Control device
52 Guide system
53 Front face
B Loading direction All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. Method for loading a container with packages, with a guide device comprising at least one guide, wherein at least one hand element is provided on the at least one guide device, wherein the hand element has a plurality of finger elements, wherein the finger elements in each case have at least two flexible flank elements extending together from one end of the finger element to the opposing end of the finger element, wherein in each case the at least two flexible flank elements of the finger elements are flexibly connected together in each case via a plurality of webs, so that the finger elements in each case may be adjusted from at least one curved position into at least one extended position and back,
   in which the at least one hand element takes packages one after the other,
   in which the at least one hand element deposits into the container the packages which have been taken one after the other in the form of a stack of packages and
   in which the at least one hand element is displaced along the at least one guide at least between the deposit of two successive packages.

2. Method according to claim 1, wherein the at least one hand element and/or at least one finger element is adjusted via a drive unit for adjusting the at least two flank elements in a longitudinal direction of the finger element relative to one another from a curved position into an extended position and/or back.

3. Method according to claim 1, in which the at least one hand element and/or at least one finger element is used with at least one pressure sensor, and
   wherein the at least one pressure sensor detects the pressure on the at least one hand element and/or on at least one finger element.

4. The method of claim 3, wherein the at least one pressure sensor is on at least one flank element, and
   wherein the at least one pressure sensor detects the pressure on at least one flank element of at least one finger element.

5. Method according to claim 1, in which the packages are taken by the at least one hand element from a conveying device, and/or
   in which the packages are deposited in the container by the at least one hand element at least substantially in layers on top of one another.

6. The method of claim 5, wherein the conveying device is a belt conveying device.

7. The method of claim 6, wherein the belt conveying device is a telescopic belt conveyor.

8. The method of claim 5, wherein the packages are deposited one after the other.

9. Method according to claim 1, in which the loading space of the container to be loaded with packages, the layer of the stack of packages already deposited by the at least one hand element, the contour of the stack of packages already deposited by the at least one hand element and/or the contour of the front face of the stack of packages already deposited by the at least one hand element are at least partially detected by a sensor.

10. The method of claim 9, wherein the sensor is an optical sensor.

11. The method of claim 10, wherein the optical sensor is a camera.

12. The method of claim 9, wherein the movement of the hand element is at least partially controlled, depending on the loading space detected by the sensor and/or position of the stack and/or contour of the stack.

13. Method according to claim 1, in which the at least one hand element is displaced along the at least one guide, depending on the loading space, on the height of the stack of packages, on the layer of the stack of packages, on the contour of the stack of packages and/or on the contour of the front face of the stack of packages.

14. Method according to claim 1, in which the at least one hand element and/or the at least one guide of the guide device is adjusted forward and/or back.

15. The method of claim 14, wherein the at least one hand element and/or the at least one guide is adjusted forward and/or back, depending on the loading space, on the height of the stack of packages, on the layer of the stack of packages, on the contour of the stack of packages and/or on the contour of the front face of the stack of packages.

16. Method according to claim 1, in which the at least one hand element and/or the at least one guide of the guide device is adjusted to the left and/or to the right.

17. The method of claim 16, wherein the at least one hand element and/or the at least one guide is adjusted forward and/or back, depending on the loading space, on the height of the stack of packages, on the layer of the stack of packages, on the contour of the stack of packages and/or on the contour of the front face of the stack of packages.

18. Method according to claim 1, in which the at least one hand element and/or the at least one guide of the guide device is adjusted upwardly and/or downwardly.

19. The method of claim 18, wherein the at least one hand element and/or the at least one guide is adjusted upwardly and/or downwardly, depending on the loading space, on the height of the stack of packages, on the layer of the stack of packages, on the contour of the stack of packages and/or on the contour of the front face of the stack of packages.

20. Method according to claim 1, in which the at least one guide device, the at least one guide and/or the at least one hand element for depositing further packages is moved in a stepwise manner into the container, further into the container, further in the direction of a position outside the container and/or is moved out of the container.

21. The method of claim 20, wherein the at least partial movement into the container, the movement in the direction of a position outside the container and/or the movement out of the container takes place depending on the loading space, on the height of the stack of packages, on the layer of the stack of packages, on the contour of the stack of packages and/or on the contour of the front face of the stack of packages.

22. Method according to claim 1, in which the at least one hand element is connected via a multi-axle arm to the guide device, to the at least one guide, to a further guide, in which the at least one hand element which is held by the multi-axle arm is pivotable about at least two different pivot axes of the multi-axle arm.

23. Method according to claim 22, in which an uppermost layer of packages of the stack of packages is deposited in the container by the at least one hand element which is held by the multi-axle arm.

24. The method of claim 23, wherein the uppermost layer of packages of the stack of packages is arranged below the upper end of the loading space and/or the roof of the container.

25. The method of claim 24, wherein the uppermost layer of packages of the stack of packages is arranged adjacent to the upper end of the loading space and/or the roof of the container.

26. Method according to claim 2, in which at least one lower layer of packages of the stack of packages is deposited into the container by at least one lower hand element, and
in which at least one upper layer of packages of the stack of packages is deposited into the container by at least one upper hand element which is held by a multi-axle arm on the associated guide.

27. The method of claim 26, wherein the at least one lower hand element is not held by a multi-axle arm on the assigned guide.

28. The method of claim 26, wherein the lower hand element and the upper hand element may be held on different guides.

29. The method of claim 28, wherein the lower hand element and the upper hand element may be displaced along the respectively associated guide.

30. The method of claim 26, wherein the lower hand element and the upper hand element are oriented at least substantially parallel to one another.

31. Method according to claim 22, in which the at least one upper layer of packages of the stack of packages is formed in a stepwise manner by at least one upper hand element.

32. Method according to claim 31, in which the stack of packages is at least substantially formed from a plurality of columns of packages of the stack of packages provided adjacent to one another or at least partially overlapping one another.

33. The method of claim 32, wherein at least two columns of packages of the stack of packages are formed one after the other.

34. The method of claim 31, wherein at least one lower layer of packages of the stack of packages is formed.

35. The method of claim 34, wherein at least one lower layer of packages of the stack of packages is formed by the lower hand element between two steps of forming the at least one upper layer by the upper hand element.

36. The method of claim 22, wherein the at least two pivot axes are arranged at least substantially at right angles to one another.

37. Method according to claim 1, in which the at least one hand element may be displaced at least substantially in the horizontal direction.

38. The method of claim 37, wherein the at least one hand element may be displaced along the at least one guide.

39. Device for loading a container with packages, according to the method of claim 1, with a guide device comprising at least one guide, wherein at least one hand element is provided on the at least one guide device, wherein the hand element has a plurality of finger elements, wherein the finger elements in each case have at least two flexible flank elements extending together from one end of the finger element to the opposing end of the finger element, wherein in each case the at least two flexible flank elements of the finger elements are flexibly connected together in each case via a plurality of webs, so that the finger elements in each case may be adjusted from at least one curved position into at least one extended position and back.

40. Device according to claim 39, wherein the at least one guide is configured in the form of a rail and the guide device is configured as a rail device comprising the at least one rail.

41. The device of claim 39, wherein the container is one of a box body, a swap container or a roll container.

42. The device of claim 39, wherein the at least one hand element is displaceable in the longitudinal direction of the guide.

43. The method of claim 1, wherein the container is one of a box body, a swap container or a roll container.

44. The method of claim 1, wherein the at least one hand element is displaceable in the longitudinal direction of the at least one guide.

45. The method of claim 1, in which the at least one guide device, the at least one guide and/or the at least one hand element for depositing at least one further layer of packages is moved in a stepwise manner into the container, further into the container, further in the direction of a position outside the container and/or is moved out of the container.

* * * * *

UNITED STATES PATENT AND TRADEMARK OFFICE
CERTIFICATE OF CORRECTION

| | |
|---|---|
| PATENT NO. | : 11,613,436 B2 |
| APPLICATION NO. | : 17/486581 |
| DATED | : March 28, 2023 |
| INVENTOR(S) | : Bernd Hartmann et al. |

It is certified that error appears in the above-identified patent and that said Letters Patent is hereby corrected as shown below:

In the Claims

Claim 26, Line 1 reads: "Method according to claim 2, in which at least one" and should read
--Method according to claim 22, in which at least one--

Signed and Sealed this
Twenty-third Day of May, 2023

Katherine Kelly Vidal
*Director of the United States Patent and Trademark Office*